(12) United States Patent
Hilsenbeck et al.

(10) Patent No.: US 8,785,837 B2
(45) Date of Patent: Jul. 22, 2014

(54) PHOTOELECTRIC BARRIER APPARATUS

(75) Inventors: Stefan Hilsenbeck, Denkendorf (DE); Alexander Forkl, Kirchheim/Teck (DE)

(73) Assignee: BALLUFF GmbH, Neuhausen (DE)

( * ) Notice: Subject to any disclaimer, the term of this patent is extended or adjusted under 35 U.S.C. 154(b) by 425 days.

(21) Appl. No.: 13/208,633

(22) Filed: Aug. 12, 2011

(65) Prior Publication Data
US 2012/0049050 A1    Mar. 1, 2012

(30) Foreign Application Priority Data

Aug. 31, 2010    (DE) .......................... 10 2010 040 051

(51) Int. Cl.
G01J 1/04    (2006.01)
(52) U.S. Cl.
USPC .......................................... 250/225
(58) Field of Classification Search
USPC ................... 250/221, 225, 566, 568; 235/462.21–462.27
See application file for complete search history.

(56) References Cited

U.S. PATENT DOCUMENTS

| | | | |
|---|---|---|---|
| 3,491,334 A | 1/1970 | Martin | |
| 3,881,106 A | 4/1975 | Pocker et al. | |
| 4,412,129 A | 10/1983 | Duncan | |
| 4,568,827 A | 2/1986 | Walter | |
| 4,626,100 A * | 12/1986 | Johnson | 356/141.3 |
| 5,010,241 A * | 4/1991 | Butterworth | 235/462.24 |
| 5,245,177 A | 9/1993 | Schiller | |
| 5,562,357 A | 10/1996 | Sandell | |
| 6,091,071 A | 7/2000 | Franz et al. | |
| 6,133,988 A | 10/2000 | Rhême et al. | |
| 6,501,523 B2 * | 12/2002 | Hirota et al. | 349/117 |
| 6,552,990 B1 * | 4/2003 | Kajiyama et al. | 369/112.06 |
| 6,879,401 B2 | 4/2005 | Gedig | |
| 7,589,311 B2 | 9/2009 | Hoersch et al. | |
| 2003/0179379 A1 | 9/2003 | Gedig | |
| 2008/0251702 A1 | 10/2008 | Melzner et al. | |
| 2009/0108185 A1 | 4/2009 | Hoersch et al. | |

FOREIGN PATENT DOCUMENTS

| | | |
|---|---|---|
| CH | 693 046 | 1/2003 |
| DE | 296 07 076 | 8/1996 |
| DE | 198 10 231 | 5/1999 |
| DE | 199 24 470 | 9/2000 |
| DE | 101 63 657 | 7/2003 |
| DE | 10 2005 045 280 | 12/2006 |
| DE | 10 2006 053 229 | 5/2008 |
| DE | 20 2007 005 710 | 8/2008 |
| FR | 2 633 081 | 12/1989 |

* cited by examiner

*Primary Examiner* — Seung C Sohn
(74) *Attorney, Agent, or Firm* — Lipsitz & McAllister, LLC

(57) ABSTRACT

A photoelectric barrier apparatus is provided, which comprises a transmitting device for light, a reflecting device and a receiving device for reflected light with at least one photodetector, wherein the at least one photodetector is arranged at an acute angle to an optical axis, wherein the at least one photodetector has a receiving face for light and the acute angle lies between the optical axis and a normal of the receiving face.

16 Claims, 5 Drawing Sheets

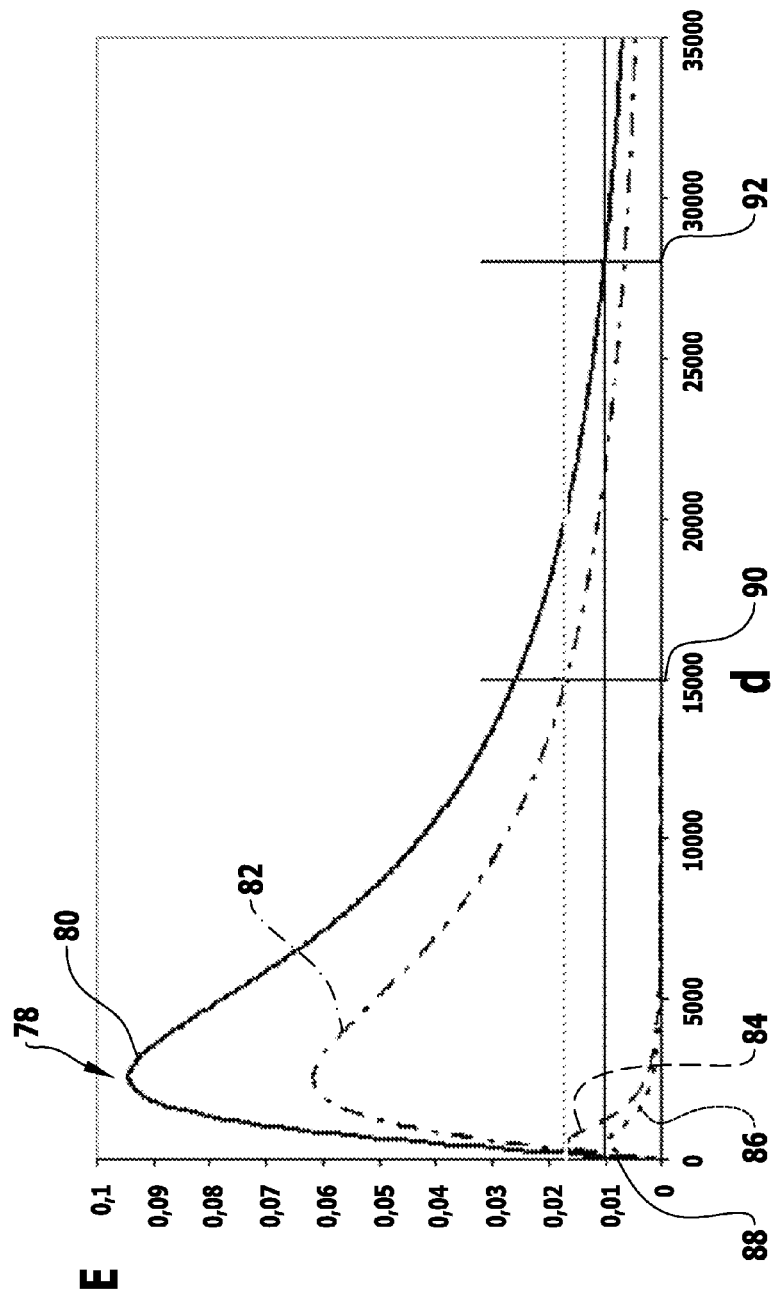

PHOTOELECTRIC BARRIER APPARATUS

This application claims the benefit of German Patent Application No. 10 2010 040 051.3 filed on Aug. 31, 2010.

The present disclosure relates to the subject matter disclosed in German application number 10 2010 040 051.3 of Aug. 31, 2010, which is incorporated herein by reference in its entirety and for all purposes.

BACKGROUND OF THE INVENTION

The invention relates to a photoelectric barrier apparatus comprising a transmitting device for light, a reflecting device and a receiving device for reflected light with at least one photodetector.

Such photoelectric barrier apparatus, which are configured, for example, as reflection photoelectric barrier apparatus, are used, for example, to detect the penetration of an object into a sensor region.

SUMMARY OF THE INVENTION

In accordance with the present invention, a photoelectric barrier apparatus is provided, which has a high degree of utilisation and/or a high function reserve and/or a high range in particular with high reflection reliability.

In accordance with an embodiment of the invention, the at least one photodetector is arranged at an acute angle to an optical axis, wherein the at least one photodetector has a receiving face for light and the acute angle lies between the optical axis and a normal of the receiving face.

The transmittance can be increased by tilting the photodetector relative to the optical axis for reception light. An increased transmittance results in an enhanced useful signal. Moreover, as a result the function reserve can be increased and the range can be increased with high reflection reliability.

In particular, the acute angle is the Brewster angle with respect to a medium, in which the at least one photodetector is arranged, and a light-transitive material of the at least one photodetector, or the acute angle lies close to the Brewster angle.

In the case of the Brewster angle a reflected beam and a beam running in the light-transitive material lie perpendicular to one another. As a consequence of this light with a polarisation in a plane of incidence is not reflected. As a result, a high transmittance is obtained with the Brewster angle and thus an enhanced useful signal.

Because of deviations in the optical structure, e.g. as a result of production tolerances, an exact adjustment of the Brewster angle can be more difficult or impossible. The advantage according to the invention is also obtained when the acute angle does not correspond exactly to the Brewster angle, but differs slightly from this. This deviation of the acute angle preferably lies at most at 20°.

In particular, the acute angle lies in the range of between 50° and 85°, in particular when at least one photodetector is an Si photodetector arranged in an air environment. The refractive index for air is one. The refractive index of silicon lies between approximately 3 and 3.9, depending on the doping of the silicon.

The transmitting device and the receiving device are arranged in a common housing. This results in a photoelectric barrier apparatus of compact structure, wherein the reflecting device is irradiated with transmission light and reflected light can be received by the receiving device.

In this case, the reflecting device is arranged outside the housing in particular. The penetration of an object between the reflecting device and the housing can be detected as a result of this.

In one embodiment a polariser device is provided. In principle, when a reflective object is brought into the optical path, the problem results that a reflection occurs on the reflective object and in some circumstances the penetration of this object is not detected because of this reflection. This risk can be remedied by the provision of a polariser device. When polarised light is emitted and in particular a polarising filter is also provided for reception light, then it can be detected whether light is reflected at a reflecting device, if this is configured to rotate polarisation, or was reflected at a mirror that does not rotate polarisation. As a result, a reflection reliability can be achieved, i.e. the photoelectric barrier device can detect whether the reflection occurred at the reflecting device or on a reflective object, which has entered the optical path.

In particular the polariser device comprises a first polarising filter, which is associated with the transmitting device. This allows polarised light, and in particular linearly polarised light, to be transmitted.

It is additionally favourable if the polariser device comprises a second polarising filter, which is associated with the receiving device. As a result of the second polarising filter the polarisation of the light passing onto the photodetector can be predetermined.

In particular, the first polarising filter and the second polarising filter predetermine different linear polarisation directions, wherein these different polarisation directions in particular are perpendicular to one another. As a result, it can be detected in a simple manner whether a reflective object without polarisation rotation has been brought into the optical path, or whether a reflection has occurred on a polarisation-rotating reflecting device.

In this case, it is favourable if the first polarising filter provides transmission light, which is polarised perpendicularly to a plane of incidence. With a polarisation-rotating reflecting device the receiving device is then subjected to light, which in particular is polarised parallel to the plane of incidence. If the photodetector is arranged at the Brewster angle, then no reflection of this thus polarised light occurs and in the ideal case a 100% transmittance is obtained. This in turn results in a high useful signal with the above-mentioned advantages.

It is also possible that no polariser device is used, in particular in association with the transmitting device comprising a laser light source. The photoelectric barrier device can be configured in a simple manner as a result of this. A type of polarisation filtering occurs as a result of the arrangement of the photodetector at the Brewster angle or close to the Brewster angle. Only light that is polarised perpendicularly to the plane of incidence is reflected, whereas light that is polarised parallel to the plane of incidence is not reflected. A high transmittance is then obtained even without the provision of polarising filters.

It is advantageous in particular if the reflecting device is configured to rotate polarisation. This allows a high reflection reliability to be achieved, i.e. it can be detected whether a reflective object has been brought into the optical path between the transmitting device, reflecting device and receiving device, or whether a reflection has occurred at the reflecting device.

In particular, the at least one photodetector is subjected to light, which is polarised linearly in a plane of incidence, at least when the at least one photodetector is subjected to light reflected at the reflecting device and the reflecting device is configured to rotate polarisation. In the ideal case, if the at least one photodetector is inclined at the Brewster angle, the reflectance at the photodetector is then zero and a 100% transmittance occurs. A high degree of utilisation is thus obtained.

The photodetector can be subjected accordingly to light polarised linearly in the plane of incidence by generating light polarised perpendicularly to the plane of incidence and subjecting the reflecting device thereto, wherein the reflecting device rotates the polarisation 90°. Alternatively or additionally hereto, a corresponding polarising filter that has a polarisation in the plane of incidence as preferred direction can be associated with the photodetector.

In one embodiment an adjusting device is provided, by means of which an angular position of the at least one photodetector can be securably set at least during the production of the photoelectric barrier device. This allows an optimised configuration to be obtained to be able to adjust to the Brewster angle or to an acute angle close to the Brewster angle. A corresponding adjusting device is described as articulating device in US 2008/0251702 or DE 20 2007 005 710 U1.

The following description of preferred embodiments serves to explain the invention in more detail in association with the drawings.

BRIEF DESCRIPTION OF THE DRAWINGS

FIG. 8 shows a characteristic curve of an exemplary embodiment of a photoelectric barrier apparatus in accordance with the invention, wherein the dependence of the energy onto a photodetector in relative units is shown in dependence on the distance of the reflecting device from the photodetector in relative units and a comparison characteristic curve.

DETAILED DESCRIPTION OF THE INVENTION

Figure 1:
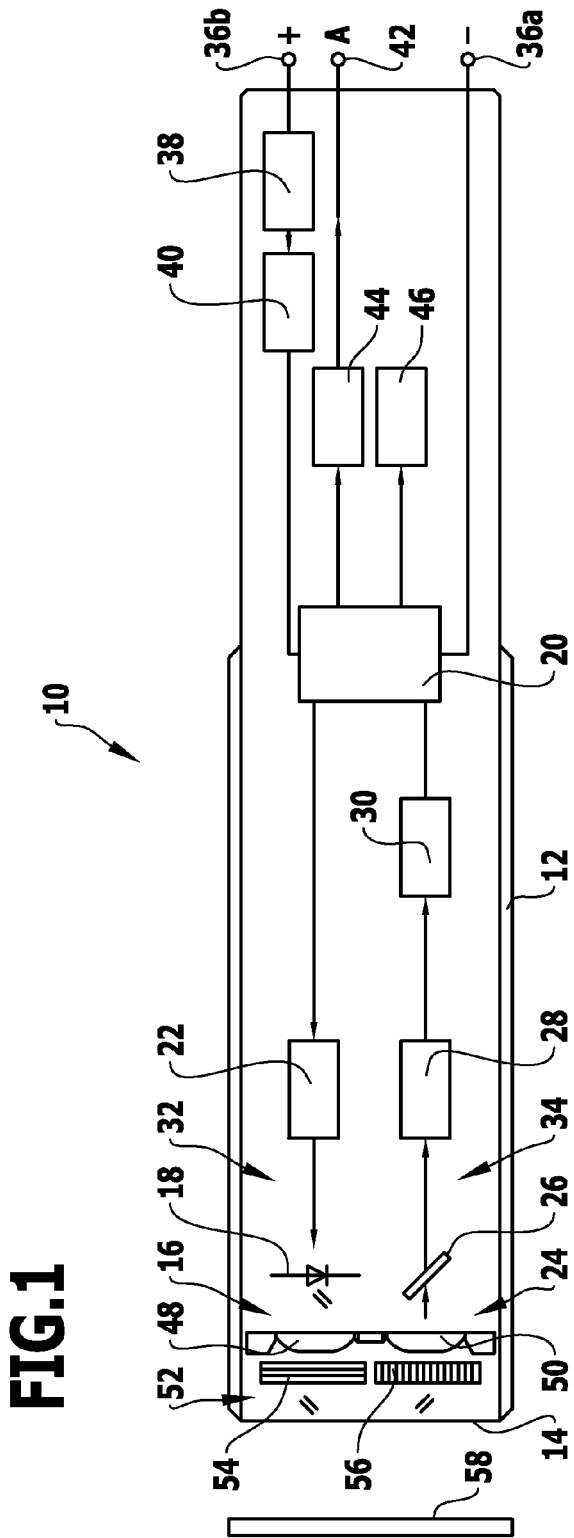
FIG. 1 is a schematic sectional view of an exemplary embodiment of a photoelectric barrier apparatus in accordance with the invention.

An exemplary embodiment of a photoelectric barrier apparatus in accordance with the invention is a reflecting photoelectric barrier apparatus shown schematically in FIG. 1 and given the reference 10 there.

The photoelectric barrier device 10 comprises a housing 12. The housing 12 has a face 14 which is a sensor side.

A transmitting device for light given the overall reference 16 is arranged in the housing 12. The transmitting device 16 comprises a primary light source 18. In an exemplary embodiment this primary light source 18 is one (or more) light-emitting diode(s). In an exemplary embodiment explained in more detail below the primary light source 18 is a laser light source.

A control unit 20, which actuates a driver 22, is arranged in the housing 12. The driver 22 is in turn associated with the primary light source 18.

In addition, a receiving device 24 for light is arranged in the housing 12. The receiving device 24 comprises (at least) one photodetector 26. The photodetector 26 is configured in particular as a photodiode.

An amplifier 28 is arranged downline of the photodetector 26. A compensating device 30 is arranged downline of the amplifier 28. Amplified and compensated signals of the photodetector 26 are supplied to the control/evaluation unit 20. The photoelectric barrier apparatus 10 thus comprises a transmission path 32 with the primary light source 18 and a reception path 34 with the photodetector 26.

The photoelectric barrier apparatus 10 has voltage inputs 36a, 36b. The photoelectric barrier apparatus 10 can be supplied with electrical energy through these. An EMV protection device 38 is associated with the voltage input 36b. A voltage regulating device 40 can be arranged between the EMV protection device 38 and the control/evaluation unit 20.

The photoelectric barrier apparatus 10 comprises at least one (signal) output 42, at which corresponding sensor signals can be picked up. A corresponding output driver 44 coupled to the control/evaluation unit 20 is associated with this signal output 42.

The photoelectric barrier apparatus 10 can additionally comprise a display device 46, which is coupled to the control/evaluation unit 20. Operating states of the photoelectric barrier apparatus 10 and/or interference states, for example, can be displayed on the display device 46.

The transmitting device 16 has an associated optical imaging device 48, which in particular comprises one or more optical lenses.

Correspondingly, the receiving device 24 has an associated optical imaging device 50, which comprises one or more optical lenses.

In an exemplary embodiment, the photoelectric barrier apparatus 10 additionally comprises a polariser device 52 with a first polarising filter 54 and a second polarising filter 56. The first polarising filter 54 and the second polarising filter 56 are configured as polariser films, for example.

The first polarising filter 54 is connected in front of the optical imaging device 48 and is thus associated with the transmitting device 16. Linearly polarised transmission light is generated by means of the first polarising filter 54, so that the photoelectric barrier apparatus 10 provides linearly polarised light as "measurement light".

In this case, the first polarising filter 54 is arranged and configured such that the transmission light is polarised perpendicularly to a plane of light incidence.

The second polarising filter 56 is arranged in front of the receiving device 24. The second polarising filter 56 generates a polarisation perpendicular to the polarisation of the first polarising filter 54. The polarisation of the second polarising filter 56 is parallel to the plane of incidence of the light.

The photoelectric barrier apparatus 10 additionally comprises a reflecting device 58 arranged outside the housing 12 in front of the face 14. The reflecting device 58 is subjected to light of the transmitting device 16. The light is reflected into the receiving device 24 and detected by the photodetector 26.

The reflecting device 58 is configured in particular to rotate polarisation. For example, it comprises a plurality of prism faces, at which total reflection can occur, which effects a 90° rotation of the polarisation plane.

Figure 2:
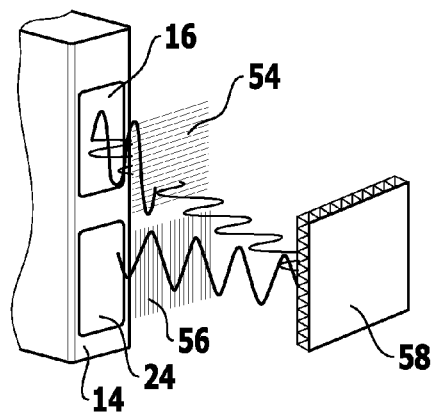
FIG. 2 is a perspective partial illustration of the photoelectric barrier apparatus according to FIG. 1 for explanation of its method of operation.

The basic method of operation of the photoelectric barrier apparatus 10 is shown in FIG. 2. Light of the transmitting device 16 is polarised perpendicularly to the plane of incidence by the first polarising filter 54 and strikes the reflecting device 58. There, the rotation of the polarisation plane and the reflected light is polarised parallel to the plane of incidence. In the ideal case, the second polarising filter 56 only allows light polarised parallel to the plane of incidence to pass through. This light is recorded by means of the photodetector 26 in the receiving device 24.

By using the polarising filters 54 and 56 a high reflection reliability is obtained, as is explained in more detail below.

Figure 3:
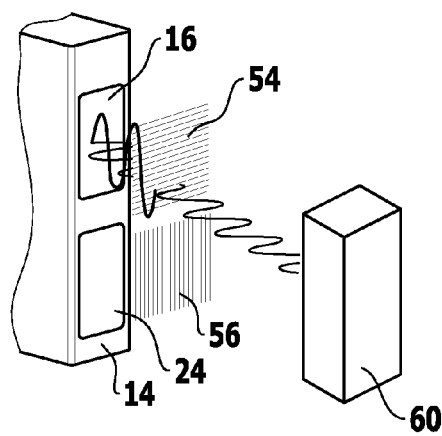
FIG. 3 is an illustration similar to that in FIG. 2 when an absorbent object is brought into the optical path.

If an absorbent object 60, as indicated in FIG. 3, passes into the optical path in front of the face 14 of the photoelectric barrier apparatus 10, then the receiving device 24 does not receive any further light, because either the optical path from the transmitting device 16 to the reflecting device 58 is interrupted and/or the optical path from the reflecting device 58 to the receiving device 24 is interrupted.

The control/evaluation unit 20 can then emit a corresponding signal for interruption of the optical path, i.e. the penetration of the object 60 between the face 14 and the reflecting device 58 is detected and a corresponding detection signal is emitted.

Figure 4:
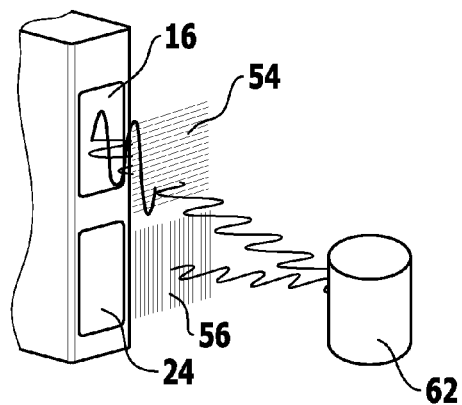
FIG. 4 is the same illustration as in FIG. 2 when a reflective object is brought into the optical path.

If a reflective object 62 (FIG. 4) such as a metal object or glass object passes into the optical path, then a reflection of transmission light of the transmitting device 16 into the receiving device 24 occurs at the object 62. This can include the risk that the object 62 is not detected as such, but a reflection at the reflecting device 58 is assumed.

However, as a rule no rotation of polarisation or at least no 90° rotation of polarisation occurs at a reflective object 62 and in particular a metal object. Therefore, if the reflective object 62 is subjected to light polarised perpendicularly to the plane of incidence, then the reflected light is also polarised perpendicularly to the plane of incidence. In the ideal case, the second polarising filter 56 does not allow this light of "incorrect polarisation" to pass or at least the intensity allowed to pass is greatly reduced. As a result, the control/evaluation unit 20 can determine whether a reflective object 62 has passed into the optical path. This is also referred to as reflection reliability.

Figure 5:
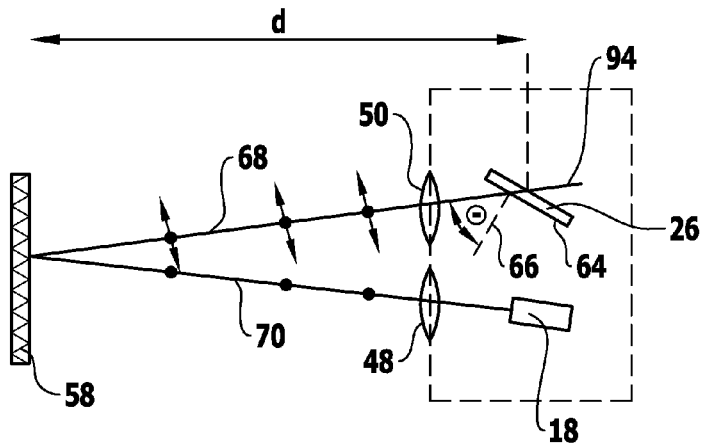
FIG. 5 is a schematic partial illustration of the photoelectric barrier device according to FIG. 1 with the optical path when light is reflected on a reflecting device.
Figure 6:
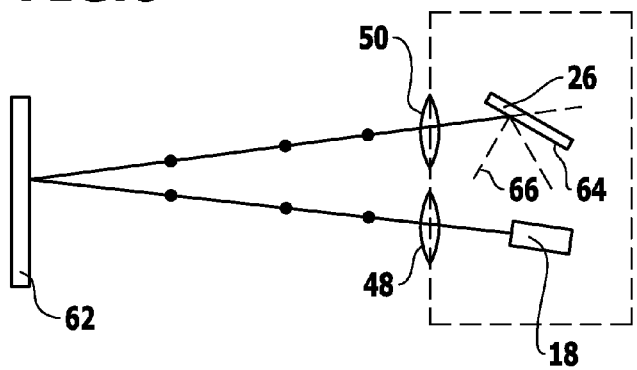
FIG. 6 is the same view as in FIG. 5 when light is reflected on a reflective object in the optical path.

The photodetector 26 has a receiving face 64 (FIGS. 5, 6). The receiving face 64 is associated with a normal 66. The photoelectric barrier apparatus 10 has an optical axis 68, which is defined by the principal ray direction of the reflected light between the reflecting device 58 and the receiving device 24. (The photoelectric barrier device 10 has a further optical axis 70, which is defined by the principal ray direction of emitted light from the transmitting device 16 to the reflecting device 58. The plane of incidence is spanned out by the optical axis 68 and optical axis 70. In the case of FIGS. 5 and 6 the plane of incidence lies at least approximately parallel to the plane of the drawing.)

It is provided in accordance with the invention that the photodetector 26 is inclined in relation to its normal 66 by an acute angle Θ to optical axis 68. The acute angle Θ in this case is at least approximately the Brewster angle $\Theta_B$.

The light-transitive and light-sensitive material of the photodetector 26 has a refractive index $n_2$. The photodetector 26 is arranged in a medium (optically thinner medium) with refractive index $n_1$. The Brewster angle is defined as $$\Theta_B = \arctan\frac{n_2}{n_1}$$

(Brewster's law).

When light strikes against the photodetector 26 at the Brewster angle $\Theta_B$, reflected light and transmitted light lie perpendicular to one another. This means that light with a polarisation parallel to the plane of incidence is not reflected in the case of the Brewster angle $\Theta_B$. Light with a polarisation parallel to the plane of incidence penetrates the surface of the photodetector 26 completely.

The following applies, in principle, for reflection, transmission and absorption at the photodetector 26:

$$1 = T + \sigma + \alpha$$

where T is the transmittance, σ the reflectance and α the absorbance. In the case of optically clear layers for usual materials for photodetectors 26 a lies at about zero.

In the case of the Brewster angle $\Theta_B$ σ is zero for light with a polarisation parallel to the plane of incidence.

Figure 7:
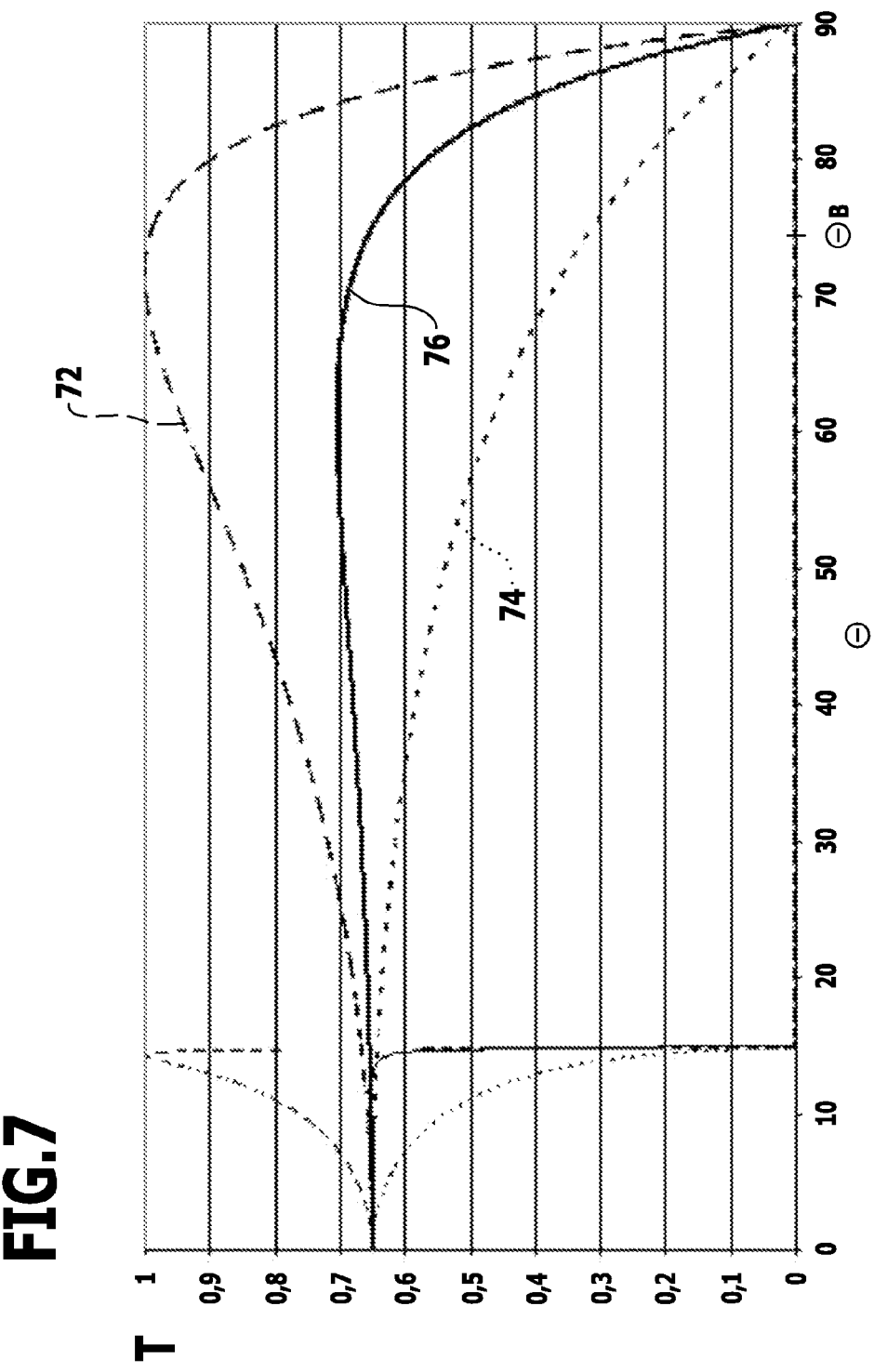
FIG. 7 shows the curve of transmission T for different angles of incidence $\Theta$ for a material with the refractive index $n_2=3.9$ in the case of a beam, which from air strikes this material for different polarisations.

FIG. 7 schematically shows the transmittance T in relation to the angle of incidence Θ for the transition from air (with refractive index $n_1=1$) to silicon (with refractive index $n_2=3.9$). In this case the curve 72 shows the light component with linear polarisation parallel to the plane of incidence. Curve 74 shows the component and linear polarisation perpendicular to the plane of incidence. Curve 76 shows the transmittance for unpolarised light.

With these relations the Brewster angle $\Theta_B$ lies at approximately 75°. There, the transmittance for light polarised in the plane of incidence (in the ideal case) is one.

When the photodetector 26 is arranged at the Brewster angle, in the ideal case the transmittance for light polarised in the plane of incidence (cf. FIG. 5) is one (100% transmission). Outside the Brewster angle the transmittance is substantially lower (cf. FIG. 7). Therefore, by tilting the photodetector 26 accordingly at an acute angle relative to the normal 66 of the receiving face 64 the useful signal can be amplified, wherein an amplification in the order of magnitude of 25% to 35%, for example, can be achieved. At the same time, the reflection reliability can also be increased as a result of this, since in the ideal case no transmission of light polarised perpendicular to the plane of incidence occurs.

As a result, a high range and function reserve can also be achieved. In particular, production tolerances of polarising filters 54, 56 can be extended or photoelectric barriers with high reflection reliability (a reflection reliability of 100%) can be produced more easily.

The mentioned advantages are also obtained if the acute angle Θ does not lie exactly at the Brewster angle $\Theta_B$, but deviates from this in particular at most in the order of 20°. In particular, the angle lies between approximately 50° and 80°, in particular when the material of the photodetector 26 is silicon.

FIG. 8 shows with curve 78 a schematic characteristic curve of a photoelectric barrier apparatus 10 according to the invention with a photodetector 26 inclined at the Brewster angle or close to the Brewster angle. In this case, the detectable energy striking against the receiving surface 64 of the photodetector 26 is shown in arbitrary units in dependence on a distance d of the photodetector 26 from the reflecting device 58.

Curve 78 has a peak 80. If the photodetector 26 (and thus the primary light source 18) lies too close to the reflecting device 58, then the light energy that strikes against the receiving surface 64 is lower. If distance d is very large, then the energy is also lower.

In comparison to curve 78, a curve 82 is shown that applies to a "conventional" solution when the photodetector 26 is not inclined at the Brewster angle. The higher useful signal for the solution in accordance with the invention with curve 78 is evident, since the transmitted light energy at the photodetector 26 is higher.

The function reserve is increased as a result of the solution in accordance with the invention. This indicates the excess radiant power at the photodetector 26. It describes the permissible degree of contamination, with which a switching operation will still occur. The increased function reserve is evident on the basis of the distance of the curves 76 and 82.

A higher sensor range results because of the higher useful signal.

FIG. 6 schematically shows the case when a reflective object 62 is located in the optical path. The transmitting device 16 transmits light with a polarisation perpendicular to the plane of incidence. Light that strikes against the photodetector 26 is then also polarised perpendicularly to the plane of incidence. The second polarising filter 56 only allows the corresponding light to pass through to a small extent. In addition, as can be seen from curve 74 in FIG. 7, the transmittance of perpendicularly polarised light at the photodetector 26 is reduced when this is arranged at the Brewster angle $\Theta_B$ or is tilted at an angle close to the Brewster angle. This means that in the case of the solution in accordance with the invention with tilted photodetector 26 the transmitted light energy is reduced when a reflective object 62 passes into the optical path in comparison to the case without tilting.

This is shown in FIG. 8. Curve 84 is a characteristic curve when a reflective object 62 lies in the optical path and the photodetector 26 is not tilted. In comparison to this, curve 86 shows the characteristic curve in the case of the solution in accordance with the invention with tilting, in particular at the Brewster angle.

As a result of the solution in accordance with the invention (characteristic curve 86) the minimum switching threshold, which is given by a peak 88 of curve 86, is lower than in the conventional solution without tilting (curve 84). The minimum switching threshold, which is determined by the peak 88, is therefore lower in the case of the solution in accordance with the invention. The parasitic signal caused by mirror reflection at the reflective object 62 is therefore weakened (e.g. by approximately 30%) by the tilting at or close to the Brewster angle. Since the minimum switching threshold is decreased, an increase in the range with reliable reflection also results. Reflection reliability is only guaranteed above the peak 88. In the case of the conventional solution without tilting this is achieved with distance d at reference 90. In the case of the solution in accordance with the invention this is achieved with a larger distance 92.

Therefore, as a result of the solution in accordance with the invention an increase in the range with reliable reflection is achieved, wherein an enhanced useful signal results and the function reserve is increased. As mentioned above, higher production tolerances can thus be provided for the polarising filters 54, 56.

In this case, it is also possible in principle, in particular if the primary light source 18 is a laser light source, to omit the polariser device 52, i.e. no polarising filters are provided.

In particular, a laser diode radiating polarised light is used as primary light source 18.

For adjustment of the tilting angle of the photodetector 26 an adjusting device 94 can be provided, by means of which the angle can be securably set at least during the production of the photoelectric barrier device. For example, an articulating device such as that described in US 2008/0251702 or DE 20 2007 005 710 U1 can be used in this case.

List of Reference Numerals
10 photoelectric barrier apparatus
12 housing
14 face
16 transmitting device
18 light source
20 control/evaluation unit
22 driver
24 receiving device
26 photodetector
28 amplifier
30 compensating device
32 transmission path
34 reception path
36a voltage input
36b voltage input
38 EMV protection device
40 voltage regulating device
42 output
44 output driver
46 display device
48 optical imaging device
50 optical imaging device
52 polariser device
54 first polarising filter
56 second polarising filter
58 reflecting device
60 object
62 reflective object
64 receiving face
66 normal
68 optical axis
70 optical axis
72 curve
74 curve
76 curve
78 curve
80 peak
82 curve
84 curve
86 curve
88 peak
90 distance
92 distance
94 adjusting device

The invention claimed is:

1. Photoelectric barrier apparatus comprising:
a transmitting device for light;
a reflecting device; and
a receiving device for reflected light with at least one photodetector;
wherein:
the at least one photodetector is arranged at an acute angle to an optical axis;
the at least one photodetector has a receiving face for light and the acute angle lies between the optical axis and a normal of the receiving face;
the acute angle is the Brewster angle in relation to a medium, in which the at least one photodetector is arranged, and a light-transitive material of the at least one photodetector, or the acute angle lies close to the Brewster angle.

2. Photoelectric barrier apparatus according to claim 1, wherein a deviation of the acute angle from the Brewster angle lies at most at 20°.

3. Photoelectric barrier apparatus according to claim 1, wherein the acute angle lies in a range of between 50° and 85°.

4. Photoelectric barrier apparatus according to claim 3, wherein the at least one photodetector is an Si photodetector arranged in an air environment.

5. Photoelectric barrier apparatus according to claim 1, wherein the transmitting device and the receiving device are arranged in a common housing.

6. Photoelectric barrier apparatus according to claim 5, wherein the reflecting device is arranged outside the housing.

7. Photoelectric barrier apparatus according to claim 1, wherein said photoelectric barrier apparatus comprises a polariser device.

8. Photoelectric barrier apparatus according to claim 7, wherein the polariser device comprises a first polarising filter, which is associated with the transmitting device.

9. Photoelectric barrier apparatus according to claim 8, wherein the polariser device comprises a second polarising filter, which is associated with the receiving device.

10. Photoelectric barrier apparatus according to claim 9, wherein the first polarising filter and the second polarising filter predetermine different linear polarisation directions.

11. Photoelectric barrier apparatus according to claim 8, wherein the first polarising filter supplies transmission light, which is polarised perpendicularly to a plane of incidence.

12. Photoelectric barrier apparatus according to claim 1, wherein no polariser device is provided.

13. Photoelectric barrier apparatus according to claim 12, wherein the transmitting device is a laser light source.

14. Photoelectric barrier apparatus according to claim 1, wherein the reflecting device is configured to rotate polarisation.

15. Photoelectric barrier apparatus according to claim 1, wherein the at least one photodetector is subjected to light, which is polarised linearly in a plane of incidence, at least when the at least one photodetector is subjected to light reflected at the reflecting device and the reflecting device is configured to rotate polarisation.

16. Photoelectric barrier apparatus according to claim 1, wherein an angular position of the at least one photodetector is adapted to be fixedly set at least during production of the photoelectric barrier device.

* * * * *